United States Patent
Chen et al.

(10) Patent No.: US 9,852,410 B1
(45) Date of Patent: Dec. 26, 2017

(54) DYNAMICALLY CONFIGURING VERIFICATION INFORMATION AT POINT-OF-SALE DEVICES

(71) Applicant: Square, Inc., San Francisco, CA (US)

(72) Inventors: Grace Huey Chen, San Francisco, CA (US); Tanya Khakbaz, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 25 days.

(21) Appl. No.: 14/307,334

(22) Filed: Jun. 17, 2014

(51) Int. Cl.
*G06Q 20/00* (2012.01)
*G06Q 20/20* (2012.01)
*G06Q 20/32* (2012.01)
*G06Q 20/40* (2012.01)
*G06Q 20/34* (2012.01)

(52) U.S. Cl.
CPC ......... *G06Q 20/202* (2013.01); *G06Q 20/204* (2013.01); *G06Q 20/322* (2013.01); *G06Q 20/341* (2013.01); *G06Q 20/4012* (2013.01)

(58) Field of Classification Search
None
See application file for complete search history.

(56) References Cited

U.S. PATENT DOCUMENTS

| | | | | |
|---|---|---|---|---|
| 9,165,296 | B2 * | 10/2015 | Gannon | G06Q 20/3567 |
| 2006/0240890 | A1 * | 10/2006 | Walker | G07F 17/32 463/23 |
| 2006/0255128 | A1 * | 11/2006 | Johnson | G06Q 20/12 235/380 |
| 2013/0226318 | A1 * | 8/2013 | Procyk | G05B 13/021 700/33 |
| 2015/0041534 | A1 * | 2/2015 | Rayner | G06Q 20/327 235/380 |

* cited by examiner

*Primary Examiner* — Fateh M Obaid
(74) *Attorney, Agent, or Firm* — Lee & Hayes, PLLC

(57) ABSTRACT

Techniques and arrangements for dynamically modifying an order of a cardholder verification method (CVM) implemented at a point-of-sale (POS) device. In some instances, the techniques instruct a POS device to determine a card network or other attributed associated with a received payment instrument and determine, based on this information, whether to implement a default order of a CVM or whether to modify the order of the CVM such that the POS device requests different verification information than if the POS device did not modify the order of the CVM.

21 Claims, 5 Drawing Sheets

DYNAMICALLY CONFIGURING VERIFICATION INFORMATION AT POINT-OF-SALE DEVICES

BACKGROUND

In today's commerce, merchants often utilize an array of different point-of-sale (POS) devices, including mobile POS devices. Merchants may use these mobile POS devices to engage in transactions with customers at different locations. For instance, a taxi driver may use a mobile POS device to charge a passenger for a taxi ride. In another example, a street vendor may use a mobile POS device to charge a customer for an item purchased from the street vendor.

Operators of traditional payment infrastructure, such as card networks and issuing banks, often struggle to adapt to this changing landscape of POS devices. Therefore, merchants and other customers may benefit from POS devices that themselves adapt to existing payment infrastructure requirements.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
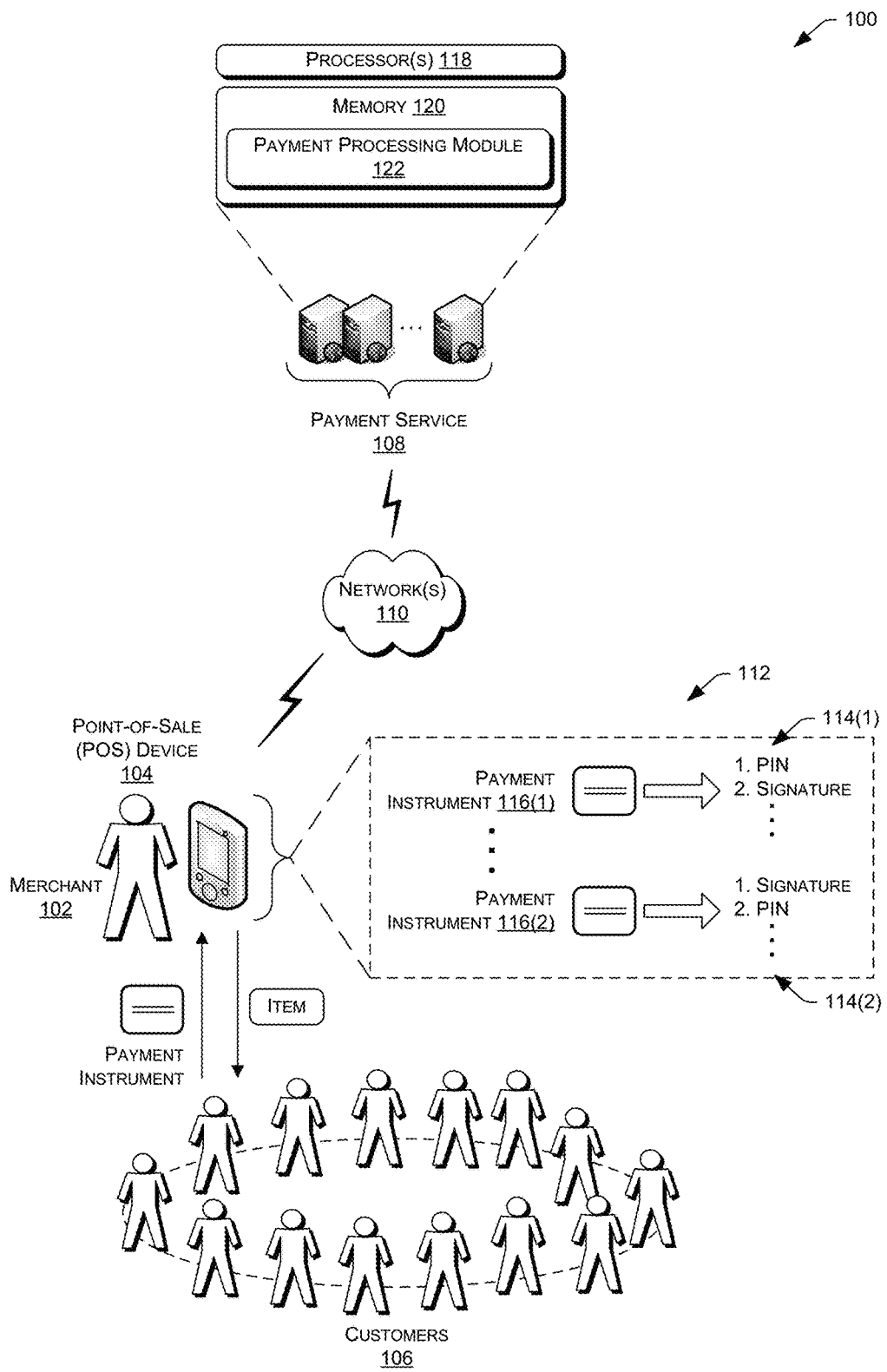
FIG. 1 illustrates an example environment that includes a merchant operating a mobile point-of-sale (POS) device to conduct transactions with multiple different customers. In some instances, the POS device dynamically reconfigures an order of verification information to request from the customers that a cardholder verification method (CVM) specifies. For instance, the POS device may determine, based on a type of payment instrument provided by a customer, whether to request verification information as specified by a default order of the CVM or whether to reconfigure this order.

Some implementations described herein include techniques and arrangements for dynamically configuring verification information at point-of-sale (POS) devices.

A POS device may be programmed to implement a cardholder verification method (CVM) that specifies an order in which the POS device is to request verification information from a customer engaging in a transaction at the POS device. For instance, the POS device may initially receive (e.g., via a swipe, a dip, manual entry, etc.) information from a payment instrument (e.g., credit card, bank card, debit card, etc.). The POS device may then determine whether the CVM dictates that the POS device is to request additional verification information and, if so, which information to request. This additional verification information may comprise a personal identifier number (PIN) associated the payment instrument, a signature of the cardholder, an answer to a security question associated with the cardholder, biometric information from the cardholder, or the like.

Before requesting the verification information, however, a POS device as described herein may determine, based on one or more attributes of a received payment instrument, specifications or capabilities of the receiving POS device, and/or the like, whether to modify the order specified by the CVM. For instance, while the CVM may initially instruct a POS device to request a PIN number from a cardholder, the POS device may determine that the CVM order should be modified such that a signature is requested rather than the PIN. After determining whether to modify the CVM order, the POS device may request verification in accordance with the (potentially modified) order. For instance, the POS device may request first verification information from the user, followed by second verification information if the first verification information does not authorize the transaction, and the like, until the transaction/payment instrument is authorized or each piece of verification information from the CVM has been requested.

In some instances, dynamically reconfiguring an order of a CVM may result in a more efficient transaction between a merchant and a customer. To provide an example, payment instruments associated with a particular card network might not accept certain verification information when input into a particular type of POS device. For instance, the card network might not accept PIN numbers entered into a device that does not include a dedicated hardware device for receiving PIN numbers (but that instead includes a touch screen or the like for receiving this information). Therefore, a POS device may determine when it receives a payment instrument associated with this card network and may dynamically reconfigure the CVM. For instance, knowing that the card network will not accept a PIN entered at the POS device, the POS device may reorder the CVM, which may include removing "PIN" as a type of verification information to request and moving "signature" into a first slot in the order. The POS device may then request a signature in lieu of a PIN, thus avoiding the situation where a cardholder enters her PIN, learns from the merchant that the PIN has not been accepted, and then is asked to provide a signature. Instead, the POS device will skip straight to requesting a signature form the cardholder, thus resulting in a quicker transaction that potentially prevents embarrassment to the merchant and/or the cardholder.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 4:
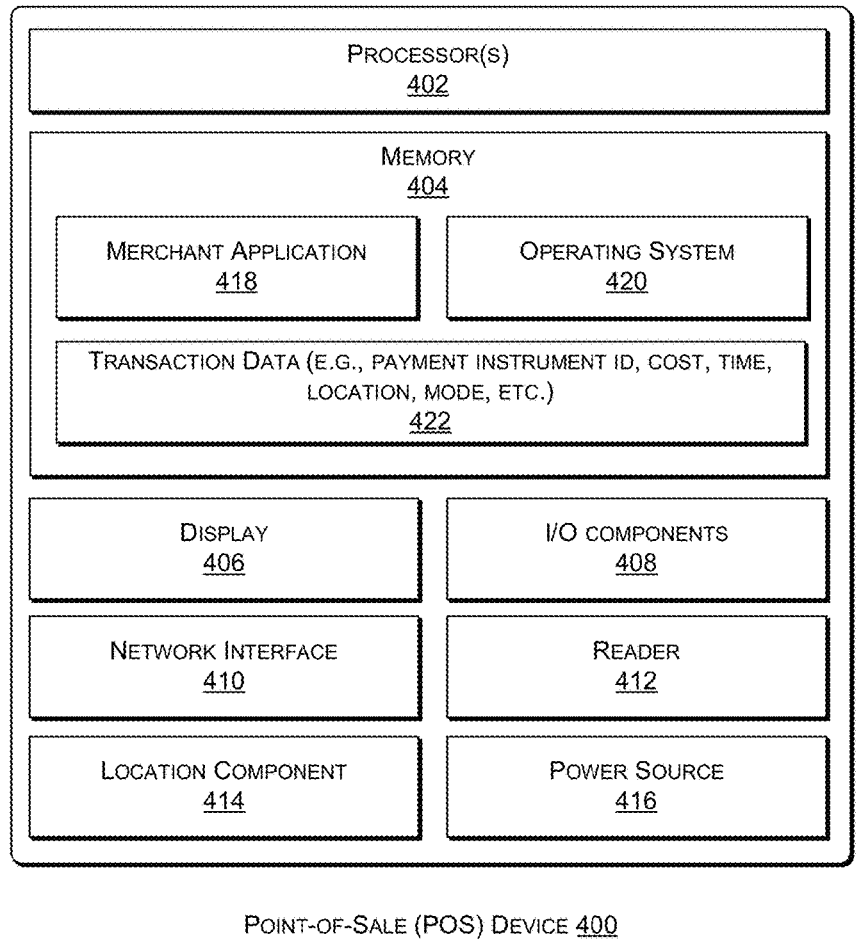
FIG. 4 illustrates select components of a POS device that a merchant described herein may utilize.

FIG. 1 illustrates an example environment 100 that includes a merchant 102 operating a point-of-sale (POS) device 104 to engage in various transactions respective customers 106. The POS device 104 may comprise any sort of mobile or non-mobile device that includes an instance of a merchant application that executes on the respective device (as illustrated in FIG. 4). The merchant application may provide POS functionality to the POS device 104 to enable the merchant 102 (e.g., an owner, employees, etc.) to accept payments from the customers 106. In some types of businesses, the POS device 104 may correspond to a store or other place of business of the merchant, and thus, may be a fixed location that typically does not change on a day-to-day basis. In other types of businesses, however, the POS device 104 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104 to process the transaction, such as by inputting (e.g., manually, via a magnetic card reader or an RFID reader, etc.) an identifier associated with the payment instrument. For example, a payment instrument of one of the customers 106 may include one or more magnetic strips for providing card and customer information when swiped in a card reader. In other examples, other types of payment cards may be used, such as smart cards having a built-in memory chip that is read by the device 104 when the card is "dipped" into the reader, a radiofrequency identification tag, or so forth.

During the transaction, the POS device 104 can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, and so forth. The POS device 104 can send the transaction information to a payment service 108 over a network 110, either substantially contemporaneously with the conducting of the transaction (in the case of online transactions) or later when the device 104 is in the online mode (in the case offline transactions).

In an offline transaction, the POS device 104 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers 106, the POS device 104 may provide the stored information to the payment service 108 over the network 110. The network 110 may represent any one or more wired or wireless networks, such as a WiFi network, a cellular network, or the like. In an online transaction, the POS device may send this information to the payment service 108 over the network 110 substantially contemporaneously with the transaction with the customer.

In some instances, the POS device 104 is configured to implement a cardholder verification method (CVM) that specifies an order of verification information to request from customers and the circumstances in which to request this information. For instance, the CVM may indicate that transactions for amounts over a threshold amount (e.g., $50) will only be authorized when verification information—in addition to the information stored by a customer's payment instrument—is provided by the customer. This information may include a personal identification number (PIN) associated with the payment instrument, a password with the payment instrument, a signature of the cardholder, or the like.

Furthermore, POS device 104 may be configured (e.g., via the merchant application executed on the device 104) to modify an order of the CVM based on payment-instrument attributes, such as a card network associated with a payment instrument, a brand of the payment instrument, an issuing bank of the payment instrument, whether the payment instrument includes a magnetic strip or a memory chip, or the like. For instance, FIG. 1 illustrates, at 112, that the POS device 104 is configured to implement a first order 114(1) when the POS device 104 receives a first payment instrument 116(1), and a second order 114(2) when the POS device 104 receives a second payment instrument 116(2). In some instances, the first payment instrument 116(1) represents a payment instrument associated with a first card network (e.g., Visa®, Mastercard®, American Express®, Diner's Club®, Discover®, etc.), while the payment instrument 116(2) represents a payment instrument associated with a different card network. In the example, the first order 114(1) specifies that the POS device 104 is first to request a PIN from a cardholder (or "customer") first, and a signature second, and so forth. The second order 114(2), meanwhile, instructs the POS device 104 requesting a signature first. After requesting and receiving the verification information (e.g., PIN, signatures, etc.), the POS device 104 may send this information to the payment service, which in turn may attempt to authorize the transaction and send a result back to the POS device.

In some instances, the example shown at 112 represents a scenario where a card network associated with the payment instrument 114(2) does not accept PINS received from the mobile POS device 104 and, therefore, the POS device dynamically modifies the first, default order 114(1) of the CVM in response to identifying the card network associated with the second payment instrument 116(2). Further, while FIG. 1 illustrates two different payment instruments and corresponding CVM orders, it is to be appreciated that any other number of payment instruments and corresponding CVM orders may be utilized.

As illustrated, the payment service 108 may include one or more processors 118 and memory 120, which may store a payment processing module 122. The payment processing module 122 may function to receive the information regarding a transaction from the POS device 104 and attempt to authorize the payment instrument used to conduct the transaction. The payment processing module 122 may then send an indication of whether the payment instrument has been approved or declined back to the POS device 104.

Generally, when a customer and a merchant enter into an electronic payment transaction, the transaction is processed by electronically transferring funds from a financial account associated with the customer to a financial account associated with the merchant. As such, the payment processing module 122 may communicate with one or more computing devices of a card network (or "card payment network"), e.g., MasterCard®, VISA®, over the network 110 to conduct financial transactions electronically. The payment processing module 122 can also communicate with one or more computing devices of one or more banks over the network 110. For example, the payment processing module 122 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

Figure 2A:
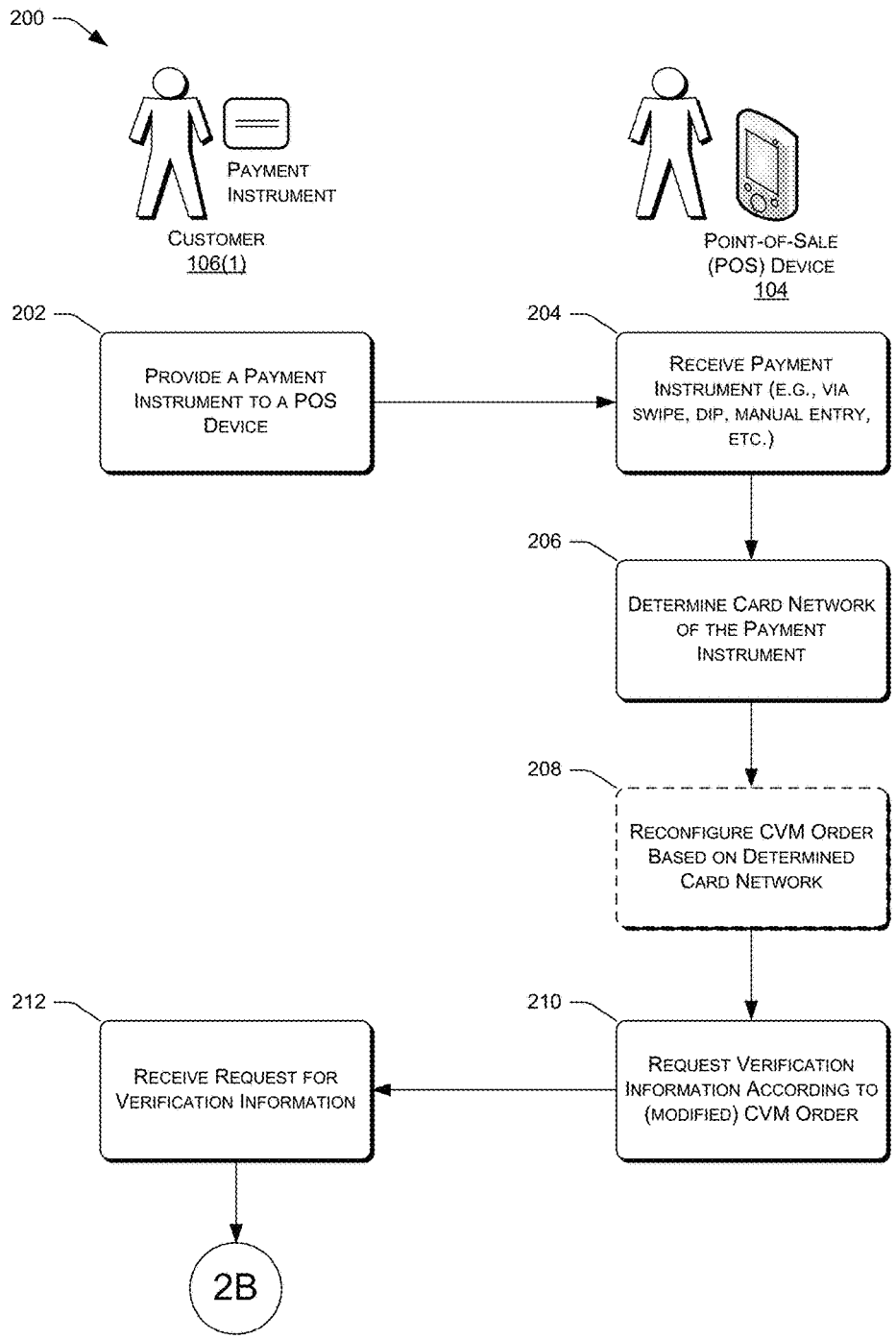
FIGS. 2A-B illustrate a flow diagram of a process for determining whether to request verification information as specified by a default order of the CVM or whether to reconfigure this order and request verification information in accordance with the reconfigured order.
Figure 2B:
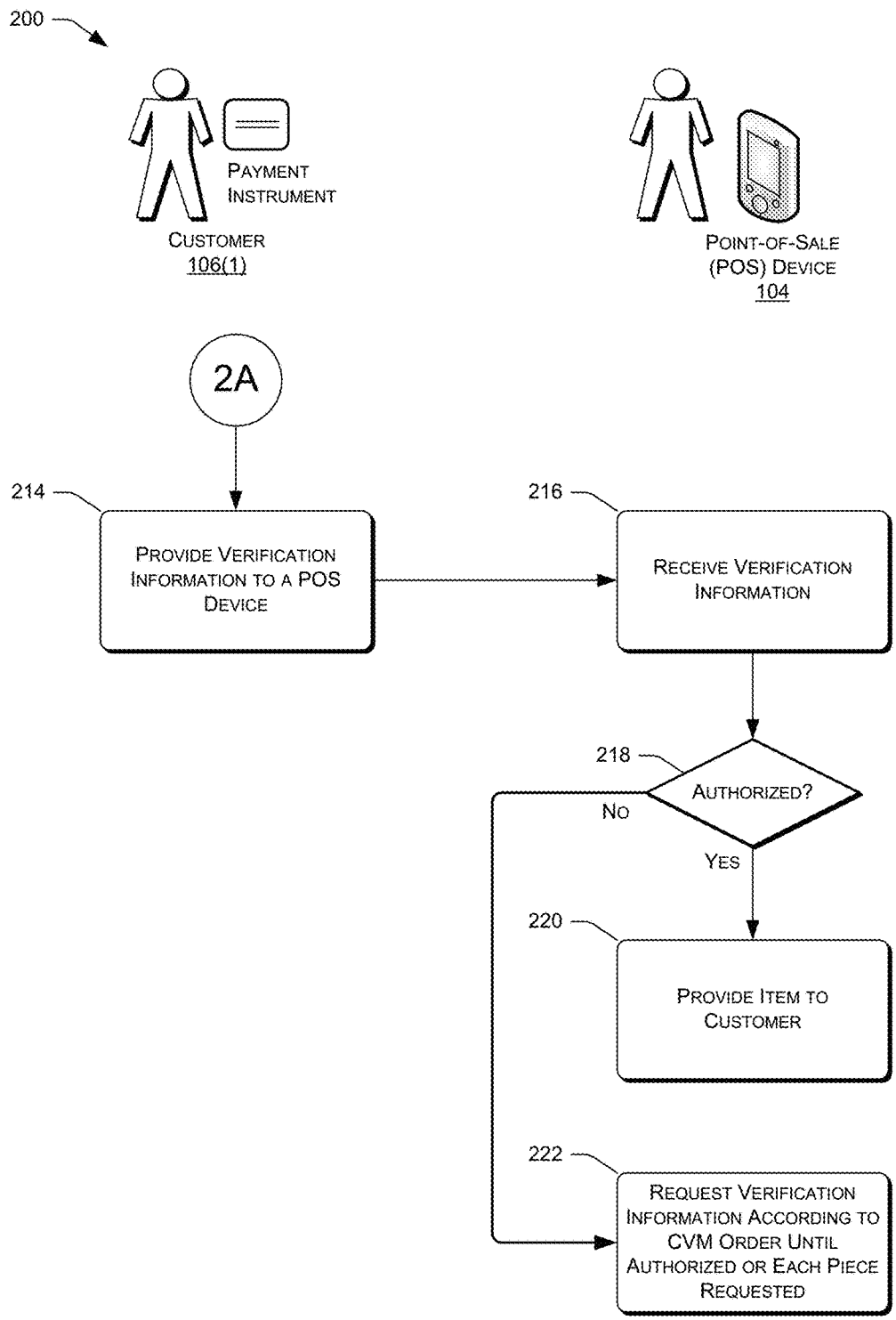

FIGS. 2A-B illustrate a flow diagram of a process 200 for determining whether to request verification information as specified by a default order of the CVM or whether to reconfigure this order and request verification information in accordance with the reconfigured order. The process 200 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 200, and other processes described herein, may be performed by a POS device, by a remote payment service (e.g., payment service 108), by another entity, or by a combination thereof.

FIG. 2A illustrates an operation 202, which represents an example customer 106(1) providing a payment instrument to merchant operating a POS device 104. For instance, the customer 106(1) may provide this payment instrument to the merchant in exchange for an item (e.g., a good or service). This payment instrument may comprise a credit card, a debit card, a bank card, a gift card, a check, or any other type of payment instrument. At an operation 204, the POS device 104 receives the payment instrument and its underlying payment information, which may include the merchant swiping a magnetic strip of the payment instrument, dipping the payment instrument and its chip into the device 104, manually entering an identifier of the payment instrument, or the like.

At an operation 206, in this example the POS device 104 determines a card network associated with the payment instrument, from the information provided to the POS device 104 by the payment instrument. For instance, the POS device 104 may determine this automatically based on the merchant swiping the card, dipping the card, manually entering the identifier, or the like. In other instances, the merchant herself may manually specify the card network (or the brand) associated with the payment instrument, such as Mastercard®, Visa®, or the like. Thereafter, the POS device 104 may determine whether to implement the default order of the CVM or whether to modify the order based on the card network. An operation 208 represents the optional step of the POS device 104 reconfiguring the order of the CVM based on the determined card network. For instance, the POS device 104 may determine, from the merchant application stored on the device, whether the order of the CVM should be modified based on which card network was determined.

Regardless of whether the POS device 104 has modified the order, at an operation 210 the POS device 104 requests verification information from the customer 106(1) according to the CVM order. For instance, if the CVM order indicates that the POS device is it to first request a PIN, then it does. Or, if the CVM order indicates that the POS device 104 is to request a signature, then the POS device 104 requests a signature of the customer 106(1) (e.g., on a touchpad of the POS device 104). An operation 212 represents the customer 106(1) receiving the request for verification information.

FIG. 2B continues the illustration of the process 200. At an operation 214, the customer provides the requested verification information to the POS device 104, such as by entering her PIN, providing a signature, or the like. An operation 216 represents the POS device 104 receiving the verification information. Next, an operation 218 represents the POS device 104 determining whether or not the payment instrument has been authorized for the current transaction with the customer 106(1), based in part on the provided verification information. For instance, the POS device 104 may provide information regarding the payment instrument (e.g., identifier, expiration date, CVC code, etc.) along with the provided verification information (e.g., PIN, signature, etc.) to the payment service 108, which in turn attempts to authorize the payment instrument for the transaction.

If the POS device 104 receives an indication that the payment instrument has been authorized, then at 220 the merchant may provide the item to the customer in some instances. If the transaction fails, however, then an operation 222 represents the POS device 104 requesting verification information according to the CVM order until the transaction is authorized or until each piece of verification information has been requested without an authorization. For instance, if the transaction fails after the customer 106(1) provides a PIN, then the POS device may move to the second verification information listed on the CVM order, such as a signature, and may request a signature from the customer 106(1). Of course, in some instances the POS device may refrain from requesting additional verification information if a first piece fails (or if the transaction fails a threshold number of times). Further, the POS device 104 may request a certain piece of verification information multiple times (e.g., may request that the user again try to enter the correct PIN in the event that the first attempt fails).

Figure 3:
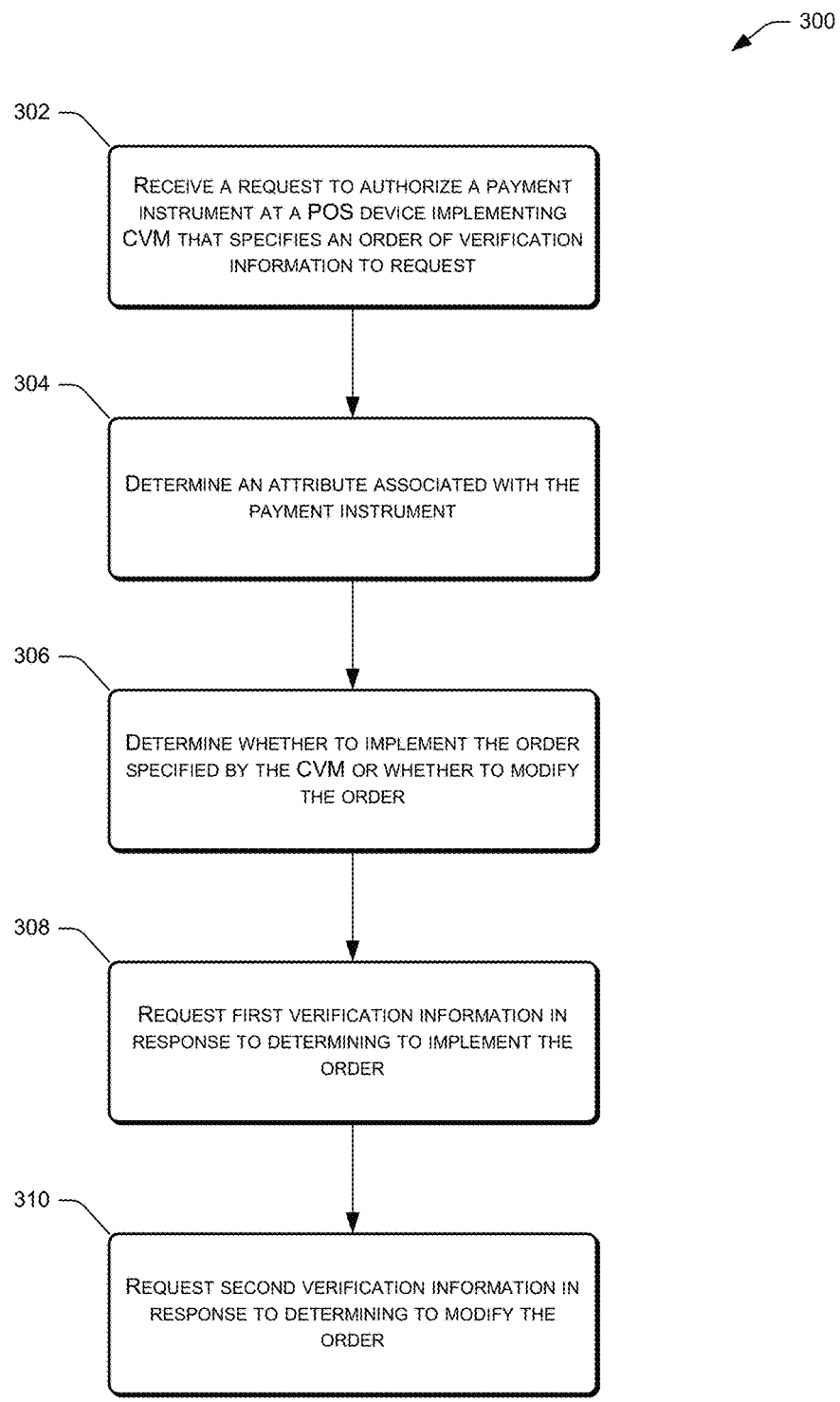
FIG. 3 illustrates a flow diagram of a process for determining whether to modify a CVM order based on an attribute of a received payment instrument, and requesting first or second verification information depending upon whether or not the order has been modified.

FIG. 3 illustrates a flow diagram of a 300 process for determining whether to modify a CVM order based on an attribute of a received payment instrument, and requesting first or second verification information depending upon whether or not the order has been modified.

At 302, the process 300 receives a request to authorize a payment instrument at a POS device, the POS device implementing a CVM that specifies of order of verification information to request to a user associated with the payment instrument. At 304, the process 300 determines an attribute associated with the payment instrument. This attribute may include a card network of the payment instrument, a brand of the payment instrument, an issuing or acquiring bank of the payment instrument, and/or the like.

At 306, the process 300 may determine whether to implement the default order specified by the CVM, or whether to modify this order, with this determination being based at least in part on the attribute of the payment instrument. In some instances, this determination is also based at least in part on a cost of the transaction, hardware or other capabilities of the POS device, and the like. For instance, if the POS device includes a touch screen to receive PINS rather than a dedicated hardware device for receiving these PINS, then the POS device may modify the order such that that a signature is listed first within the verification-information order.

At 308, the process 300 requests first verification information in response to determining to implement the default order of the CVM. That is, the POS device 104 may request the first listed piece of verification information, such as a PIN. At 310, meanwhile, the process 300 requests second, different verification information in response to determining to modify the order of the CVM. This second verification information may comprise a signature rather than a PIN in some instances.

FIG. 4 illustrates select example components of an example POS device 400 according to some implementations. The POS device 400 may be any suitable type of computing device, e.g., mobile, semi-mobile, semi-stationary, or stationary. Some examples of the POS device 400 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 400 includes at least one processor 402, memory 404, a display 406, one or more input/output (I/O) components 408, one or more network interfaces 410, at least one card reader 412, at least one location component 414, and at least one power source 416. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable processor-executable instructions stored in the memory 404.

Depending on the configuration of the POS device 400, the memory 404 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 404 may include, but is not limited to, RAM, ROM, EEPROM, flash memory, solid-state storage, magnetic disk storage, optical storage, and/or other computer-readable media technology. Further, in some cases, the POS device 400 may access external storage, such as RAID storage systems, storage arrays, network attached storage, storage area networks, cloud storage, or any other medium that can be used to store information and that can be accessed by the processor 402 directly or through another computing device or network. Accordingly, the memory 404 may be computer storage media able to store instructions, modules or components that may be executed by the processor 402. Further, when mentioned, non-transitory computer-readable media exclude media such as energy, carrier signals, electromagnetic waves, and signals per se.

The memory 404 may be used to store and maintain any number of functional components that are executable by the processor 402. In some implementations, these functional components comprise instructions or programs that are executable by the processor 402 and that, when executed, implement operational logic for performing the actions and services attributed above to the POS device 400. Functional components of the POS device 400 stored in the memory 404 may include a merchant application 418, discussed above. The merchant application 418 may present an interface on the POS device 400 to enable the merchant to conduct transactions, receive payments, and so forth, as well as communicating with the payment service 102 for processing payments and sending transaction information. Further, the merchant application 418 may present an interface to enable the merchant to manage the merchant's account, and the like. The merchant application 418 may also include a module for dynamically modifying an order of a CVM based on attributes of a payment instrument, potentially based on additional factors, as described above with reference to FIGS. 1-3.

Additional functional components may include an operating system 420 for controlling and managing various functions of the POS device 400 and for enabling basic user interactions with the POS device 400. The memory 404 may also store transaction data 422 that is received based on the merchant associated with the POS device 400 engaging in various transactions with customers, such as the example customers 106 from FIG. 1.

In addition, the memory 404 may also store data, data structures and the like, that are used by the functional components. For example, this data may include item information that includes information about the items offered by the merchant, which may include images of the items, descriptions of the items, prices of the items, and so forth. Depending on the type of the POS device 400, the memory 404 may also optionally include other functional components and data, which may include programs, drivers, etc., and the data used or generated by the functional components. Further, the POS device 400 may include many other logical, programmatic and physical components, of which those described are merely examples that are related to the discussion herein.

The network interface(s) 410 may include one or more interfaces and hardware components for enabling communication with various other devices over the network or directly. For example, network interface(s) 410 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 4 further illustrates that the POS device 400 may include the display 406 mentioned above. Depending on the type of computing device used as the POS device 400, the display 406 may employ any suitable display technology. For example, the display 406 may be a liquid crystal display, a plasma display, a light emitting diode display, an OLED (organic light-emitting diode) display, an electronic paper display, or any other suitable type of display able to present digital content thereon. In some examples, the display 406 may have a touch sensor associated with the display 406 to provide a touchscreen display configured to receive touch inputs for enabling interaction with a graphic interface presented on the display 406. Accordingly, implementations herein are not limited to any particular display technology. Alternatively, in some examples, the POS device 400 may not include the display 406, and information may be present by other means, such as aurally.

The I/O components 408, meanwhile, may include speakers, a microphone, a camera, and various user controls (e.g., buttons, a joystick, a keyboard, a keypad, etc.), a haptic output device, and so forth.

In addition, the POS device 400 may include or may be connectable to a payment instrument reader 412. In some examples, the reader 412 may plug in to a port in the merchant device, such as a microphone/headphone port, a data port, or other suitable port. In other instances, the reader 412 is integral with the entire POS device 400. The reader may include a read head for reading a magnetic strip of a payment card, and further may include encryption technology for encrypting the information read from the magnetic strip. Alternatively, numerous other types of card readers may be employed with the POS devices 400 herein, depending on the type and configuration of a particular POS device 400.

The location component 414 may include a GPS device able to indicate location information, or the location component 414 may comprise another other location-based sensor. The POS device 400 may also include one or more additional sensors (not shown), such as an accelerometer, gyroscope, compass, proximity sensor, and the like. Additionally, the POS device 400 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. One or more non-transitory computer-readable media storing computer-executable instructions that, when executed on one or more processors, cause the one or more processors to perform acts comprising:

receiving, via a card reader, a request to authorize a payment instrument at a point-of-sale (POS) device, the POS device programmed to implement a cardholder verification method (CVM) that specifies an order of verification information to request for verifying payment instruments;

determining, by the POS device, a card network associated with the payment instrument;

receiving, from a computing device associated with the card network, an indication that the card network is unable to process first verification information specified by the order of verification information;

responsive to receiving the indication from the computing device associated with the card network, dynamically modifying the order of the verification information specified by the CVM; and requesting, via a user interface on the POS device, second verification information from a user associated with the payment instrument at least partly in response to determining to modify the order specified by the CVM.

2. The one or more non-transitory computer-readable media as recited in claim 1, the acts further comprising determining an attribute of the payment instrument, wherein the attribute comprises an issuing bank associated with the payment instrument.

3. The one or more non-transitory computer-readable media as recited in claim 1, the acts further comprising determining an attribute of the payment instrument, wherein the attribute comprises whether the payment instrument includes a magnetic strip storing payment information associated with the payment instrument or a chip storing the payment information associated with the payment instrument.

4. The one or more non-transitory computer-readable media as recited in claim 1, wherein the first verification information comprises a personal identification number (PIN) or a signature of the user associated with the payment instrument and the second verification information comprises the other of the PIN or the signature.

5. The one or more non-transitory computer-readable media as recited in claim 1, wherein the determining to implement the order specified by the CVM is further based at least in part on a capability of the POS device.

6. An apparatus comprising:

a reader to receive a payment instrument for satisfying a cost of a transaction;

one or more processors; and one or more computer-readable media storing computer-executable instructions that, when executed by the one or more processors, cause the one or more processors to:

determine a card network associated with the payment instrument received by the reader;

receive, from a computing device associated with the card network, an indication that the card network is unable to receive first verification information, wherein the first verification information is a first type of verification information of a cardholder verification method (CVM) that specifies an order of verification information to request from a user of the payment instrument;

responsive to receiving the indication from the computing device associated with the card network, dynamically reconfigure the order of verification information to request from the user based at least in part on the indication; and request second verification information from the user of the payment instrument according to the order.

7. The apparatus as recited in claim 6, wherein the requesting comprises requesting verification information according to the order until the payment instrument is authorized or each verification information of the order has been requested.

8. The apparatus as recited in claim 6, further comprising determining an attribute of the payment instrument, wherein the attribute comprises a brand of the payment instrument.

9. The apparatus as recited in claim 6, further comprising determining an attribute of the payment instrument, wherein the attribute comprises whether the payment instrument includes a magnetic strip that stores payment information or a chip that stores the payment information.

10. The apparatus as recited in claim 6, wherein the determining of the order is also based at least in part on the cost of the transaction.

11. The apparatus as recited in claim 6, wherein the determining of the order is also based at least in part on specifications of the apparatus.

12. The apparatus as recited in claim 6, further comprising a touch-sensitive display to display information regarding the transaction and to receive a signature from a user associated with the payment instrument.

13. A method implemented at least in part by a point-of-sale (POS) device, the method comprising:
    receiving, via card reader, a request to authorize a payment instrument at the POS device, the POS device programmed to implement a cardholder verification method (CVM) that specifies an order of verification information to request for verifying payment instruments;
    determining a card network associated with the payment instrument;
    receiving, from a computing device associated with the card network, an indication that the network is unable to process first verification information of the order of verification information;
    responsive to receiving the indication from the computing device associated with the card network, dynamically modifying the order of the verification information specified by the CVM; and
    requesting, via a user interface on the POS device, second verification information from a user associated with the payment instrument at least partly in response to determining to modify the order specified by the CVM.

14. The method as recited in claim 13, wherein the first verification information comprises a personal identifier number (PIN) and the second verification information comprises a signature of the user associated with the payment instrument.

15. The method as recited in claim 13, wherein the determining to modify the order of the CVM is further based at least in part on a cost of a transaction for which the payment instrument is being authorized.

16. A system comprising:
    a processor;
    a memory storing computer-executable instructions that, when executed by the processor, cause the processor to:
        receive, via card reader, a request to authorize a payment instrument at a point-of-sale (POS) device, the POS device programmed to implement a cardholder verification method (CVM) that specifies an order of verification information to request for verifying payment instruments;
        determine a card network associated with the payment instrument;
        receive, from a computing device associated with the card network, an indication that the card network is unable to process first verification information of the order of verification information;
        responsive to receiving the indication from the computing device associated with the card network, dynamically modify the order of verification information specified by the CVM; and
        request, via the user interface on the POS device, second verification information from a user associated with the payment instrument at least partly in response to determining to modify the order specified by the CVM.

17. The system of claim 16, wherein the first verification information comprises a personal identifier number (PIN) and the second verification information comprises a signature of the user associated with the payment instrument.

18. The system of claim 16, wherein the determining to modify the order of the CVM is further based at least in part on a cost of a transaction for which the payment instrument is being authorized.

19. The system of claim 16, wherein the instructions further cause the processor to determine an attribute, the attribute comprising whether the payment instrument includes a magnetic strip storing payment information associated with the payment instrument or a chip storing the payment information associated with the payment instrument.

20. The system of claim 16, wherein the instructions further cause the processor to determine an attribute, the attribute comprising an issuing bank associated with the payment instrument.

21. The apparatus as recited in claim 6, wherein the determining of the order is further based at least in part on one of hardware associated with the POS device or a capability of the POS device.

* * * * *